United States Patent
Deng et al.

(10) Patent No.: US 8,277,683 B2
(45) Date of Patent: Oct. 2, 2012

(54) NANO-SIZED STRUCTURED LAYERED POSITIVE ELECTRODE MATERIALS TO ENABLE HIGH ENERGY DENSITY AND HIGH RATE CAPABILITY LITHIUM BATTERIES

(75) Inventors: Haixia Deng, Woodridge, IL (US); Ilias Belharouak, Bolingbrook, IL (US); Khalil Amine, Oak Brook, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 473 days.

(21) Appl. No.: 12/454,748

(22) Filed: May 22, 2009

(65) Prior Publication Data

US 2009/0297947 A1    Dec. 3, 2009

Related U.S. Application Data

(60) Provisional application No. 61/057,400, filed on May 30, 2008.

(51) Int. Cl.
*H01M 4/88* (2006.01)

(52) U.S. Cl. .......... 252/182.1; 252/500; 429/218.1; 429/219; 429/223; 429/231.3; 429/231.95; 429/232

(58) Field of Classification Search .......... 252/500, 252/182.1; 429/218.1, 219, 223, 231.95, 429/232, 231.3
See application file for complete search history.

(56) References Cited

U.S. PATENT DOCUMENTS

| | | | |
|---|---|---|---|
| 4,513,143 A | 4/1985 | Ng et al. | |
| 4,857,423 A | 8/1989 | Abraham et al. | |
| 5,487,959 A | 1/1996 | Koksbang | |
| 5,709,968 A | 1/1998 | Shimizu | |
| 5,731,106 A | 3/1998 | Tsutsumi et al. | |
| 5,763,119 A | 6/1998 | Adachi | |
| 5,824,434 A | 10/1998 | Kawakami et al. | |
| 5,858,573 A | 1/1999 | Abraham et al. | |
| 6,004,698 A | 12/1999 | Richardson et al. | |
| 6,045,952 A | 4/2000 | Kerr et al. | |
| 6,074,777 A | 6/2000 | Reimers et al. | |

(Continued)

FOREIGN PATENT DOCUMENTS

WO    WO 2006/118279    * 11/2006

(Continued)

OTHER PUBLICATIONS

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

(Continued)

*Primary Examiner* — Khanh Tuan Nguyen
(74) *Attorney, Agent, or Firm* — Foley & Lardner LLP (57) ABSTRACT

Nano-sized structured dense and spherical layered positive active materials provide high energy density and high rate capability electrodes in lithium-ion batteries. Such materials are spherical second particles made from agglomerated primary particles that are $Li_{1+\alpha}(Ni_xCo_yMn_z)_{1-t}M_tO_{2-d}R_d$, where M is selected from can be Al, Mg, Fe, Cu, Zn, Cr, Ag, Ca, Na, K, In, Ga, Ge, V, Mo, Nb, Si, Ti, Zr, or a mixture of any two or more thereof, R is selected from F, Cl, Br, I, H, S, N, or a mixture of any two or more thereof, and $0 \leq \alpha \leq 0.50$; $0 < x \leq 1$; $0 \leq y \leq 1$; $0 < z \leq 1$; $0 \leq t \leq 1$; and $0 \leq d \leq 0.5$. Methods of preparing such materials and their use in electrochemical devices are also described.

4 Claims, 11 Drawing Sheets

U.S. PATENT DOCUMENTS

| | | | |
|---|---|---|---|
| 6,207,326 | B1 | 3/2001 | Kawakami et al. |
| 6,221,531 | B1 | 4/2001 | Vaughey et al. |
| 6,291,107 | B1 | 9/2001 | Shimizu |
| 6,387,571 | B1 | 5/2002 | Lain et al. |
| 6,395,423 | B1 | 5/2002 | Kawakami et al. |
| 6,506,516 | B1 | 1/2003 | Wietelmann et al. |
| 6,780,545 | B2 | 8/2004 | Birke-Salam et al. |
| 6,827,921 | B1 | 12/2004 | Singhal et al. |
| 6,890,510 | B2 | 5/2005 | Spitler et al. |
| 7,205,072 | B2 * | 4/2007 | Kang et al. ............... 429/231.95 |
| 2003/0091892 | A1 | 5/2003 | Watanabe et al. |
| 2003/0118912 | A1 | 6/2003 | Watanabe et al. |
| 2003/0190529 | A1 | 10/2003 | Kim et al. |
| 2004/0013944 | A1 | 1/2004 | Lee et al. |
| 2004/0028996 | A1 | 2/2004 | Hamamoto et al. |
| 2004/0029017 | A1 | 2/2004 | Besenhard et al. |
| 2004/0110063 | A1 * | 6/2004 | Uchitomi et al. ............. 429/223 |
| 2004/0121239 | A1 | 6/2004 | Abe et al. |
| 2004/0157126 | A1 | 8/2004 | Belharouak et al. |
| 2004/0175622 | A9 | 9/2004 | Hu et al. |
| 2004/0191633 | A1 | 9/2004 | Johnson et al. |
| 2004/0202934 | A1 | 10/2004 | Zaghib et al. |
| 2004/0214091 | A1 | 10/2004 | Lim et al. |
| 2004/0253518 | A1 * | 12/2004 | Hosoya et al. ................ 429/232 |
| 2005/0019670 | A1 | 1/2005 | Amine et al. |
| 2005/0106470 | A1 | 5/2005 | Yoon et al. |
| 2005/0227143 | A1 | 10/2005 | Amine et al. |
| 2007/0202405 | A1 * | 8/2007 | Shizuka et al. ............ 429/231.3 |
| 2009/0029253 | A1 * | 1/2009 | Itou et al. ...................... 429/223 |
| 2010/0047694 | A1 * | 2/2010 | Chu et al. ...................... 429/232 |

FOREIGN PATENT DOCUMENTS

| | | | |
|---|---|---|---|
| WO | WO 2008/035854 | * | 3/2008 |

OTHER PUBLICATIONS

Ravet, N. et al., "Electroactivity of natural and synthetic triphylite," *Journal of Power Sources,* vols. 97-98, pp. 503-507, Jul. 3, 2001; published by Elsevier Science B.V.

Davidson, I. J. et al., "Rechargeable cathodes based on $Li_2CR_xMn_{2-x}O_4$," *Journal of Power Sources,* vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics,* vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters,* vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters,* vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters,* vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.,* vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.,* vol. 148, No. 3, pp. A224-A229, 2001; published by The Electrochemical Society, Inc.

Franger, S. et al., "Optimized Lithium Iron Phosphate for High-Rate Electrochemical Applications," *J. Electrochem. Soc.,* vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials,* vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.,* vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.,* vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \leq y \leq 1$) Compounds," *J. Electrochem. Soc.,* vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine,* vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.,* vol. 151, No. 9, pp. A1429-A1435, 2004; published by The Electrochemical Society, Inc.

Chen, J. et al., "Chemical Overcharge and Overdischarge Protection for Lithium-Ion Batteries," *Electrochemical and Solid-State Letters,* vol. 8, No. 1, pp. A59-A62, 2005; published by The Electrochemical Society, Inc.

Komaba, S. et al., "2-Vinylpyridine as Film-forming Additve [sic] to Suppress the Degradation of Carbon Anode by Dissolved Manganese for E/LiMn2O4 Rechargable Battery," Chemistry Letters, 2002, No. 12, pp. 1236-1237; published by The Chemical Society of Japan.

* cited by examiner

NANO-SIZED STRUCTURED LAYERED POSITIVE ELECTRODE MATERIALS TO ENABLE HIGH ENERGY DENSITY AND HIGH RATE CAPABILITY LITHIUM BATTERIES

CROSS-REFERENCE TO RELATED APPLICATIONS

This application claims the benefit of U.S. Provisional Application No. 61/057,400, filed May 30, 2008, which is incorporated herein by reference, in its entirety, for any and all purposes.

GOVERNMENT RIGHTS

The United States Government has rights in this invention pursuant to Contract No. W-31-109-ENG-38 between the United States Department of Energy and UChicago Argonne, LLC.

FIELD

The invention is generally related to active materials for battery applications. More specifically, the invention relates to nano-sized structured positive active materials and methods of preparing them for use in lithium-ion batteries.

BACKGROUND

Rechargeable lithium ion batteries have been the major power sources for a wide range of electronic products since their first commercialization in the 1990s. At present, they are being considered to power electric vehicles (EVs), hybrid electric vehicles (HEVs), and plug-in hybrid electric vehicles (PHEVS) to alleviate the increasing energy crisis and air pollution. For such applications, lithium ion batteries providing higher energy density and higher power capability are required to meet the energy and power demands of such vehicles.

To prepare lithium ion cells with an increased practical energy density, cathodic materials having high specific capacity, high operating voltage, high packing density, and good rate capability are desired. To obtain a higher rate capability, and thus a higher power capability, both good ionic conductivity with rapid lithium-ion diffusion within the host, and good electronic conductivity, to transfer electrons from the host to the external circuit during the charging and discharging processes are required. The electrochemical performance of an electrode material, however, depends on several aspects, varying from the composition, structure, to the morphology of the secondary and primary particles that constitute the active electrode material.

SUMMARY

In one aspect, a material is provided comprising a plurality of metal oxide secondary particles comprising primary particles, wherein the average primary particle size is about 1 nm to 500 nm; the average secondary particle size is about 1 µm to 100 µm; and the material is a positive active material. In some embodiments, the average secondary particle size is about 10 µm to 100 µm. In other embodiments, the average secondary particle size is about 10 µm to 30 µm. In some embodiments, the average primary particle size is about 5 nm to 200 nm, and the average secondary particle size is about 1 µm to 10 µm. In other embodiments, the average primary particle size is about 10 nm to 100 nm, and the average secondary particle size is about 1 µm to 30 µm. In yet other embodiments, the secondary particles are spherical.

In some embodiments, the primary particles comprise $Li_{1+\alpha'}(Ni_xCo_yMn_z)_{1-t}M_tO_{2-d}R_d$, wherein
M is selected from Al, Mg, Fe, Cu, Zn, Cr, Ag, Ca, Na, K, In, Ga, Ge, V, Mo, Nb, Si, Ti, Zr, or a mixture of any two or more thereof;
R is selected from F, Cl, Br, I, H, S, N, or a mixture of any two or more thereof; and
$0 \leq \alpha \leq 0.50$; $0 < x \leq 1$; $0 \leq y \leq 1$; $0 < z \leq 1$; $0 \leq t \leq 1$; and $0 \leq d \leq 0.5$.

In some such embodiments, the primary particles comprise $Li_{1+\alpha'}Ni_{x'}Mn_{z'}O_{2-d'}F_{d'}$; wherein α' is from 0 to 0.2, x' is from 0.1 to 0.6, z' is from 0.2 to 0.6, and d' is from 0 to 0.1. In other such embodiments, the primary particles comprise $Li_{1+\alpha'}Ni_{x'}Co_{y'}Mn_{z''}O_{2-d'}F_{d'}$, wherein α' is from 0 to 0.2, x' is from 0.1 to 0.6, y' is from 0.01 to 0.4, z'' is from 0.1 and 0.6, and d' is from 0 to 0.1. Alternatively, the primary particles comprise a composite formula of $\beta LiMe'O_2 \cdot (1-\beta)Li_2Me''O_3$; wherein $0 < \beta < 1$; Me' is one or more ions having an average oxidation state of three with at least one ion being Ni; and Me'' is one or more ions having an average oxidation state of four with at least one ion being Mn. In some embodiments, the $LiMe'O_2$ and $Li_2Me''O_3$ are layered and the ratio of Li to Me' and Me'' is greater than one but less than two. In still other embodiments, the primary particles comprise $Li_{1.1}Ni_{0.2}Mn_{0.6}$. In yet other embodiments, the primary particles comprise $Li_{1.3}Ni_{0.2}Mn_{0.6}O_2$.

In another aspect, a process for preparing the above materials is provided. The process includes preparing an acidic solution; preparing a basic solution; combining the acidic solution with the basic solution; and precipitating a nano-sized structured precursor from the combined acidic and basic solutions to provide the material. In some embodiments, the nano-sized structured precursor comprises $(Ni_xCo_yMn_z)_{1-t}M_tCO_{3-d}R_d$; M is selected from Al, Mg, Fe, Cu, Zn, Cr, Ag, Ca, Na, K, In, Ga, Ge, V, Mo, Nb, Si, Ti, Zr, or a mixture of any two or more thereof; R is selected from F, Cl, Br, I, H, S, N, or a mixture of any two or more thereof; and $0 < x \leq 1$, $0 \leq y \leq 1$, $0 < z \leq 1$, $0 \leq t \leq 1$, and $0 \leq d \leq 1$.

In some embodiments, the step of preparing the acid solution comprises dissolving a metal precursor salt, $M'_\delta X'_\gamma$, in distilled water or an organic solvent; wherein M' is selected from Ni, Co, Mn, Al, Mg, Fe, Cu, Zn, V, Mo, Nb, Cr, Si, Ti, Zr, or a mixture of any two or more thereof; X' is selected from $NO_3^-$, $SO_4^{2-}$, $Co_3^{2-}$, $PO_4^{3-}$, $F^-$, $Cl^-$, $Br^-$, $I^-$, or a mixture of any two more thereof; $1 \leq \delta \leq 3$; and $1 \leq \gamma \leq 3$. In some such embodiments, M' is nickel, cobalt, manganese, or a mixture of any two or more thereof.

In some embodiments, the step of preparing the basic solution comprises dissolving a precipitating agent or chelating agent in distilled water or an organic solvent, wherein the precipitating agent or chelating agent is selected from sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, or a mixture of any two or more thereof. In some such embodiments, the precipitating agent or chelating agent is selected from sodium carbonate, sodium hydrogen carbonate, ammonium carbonate, ammonium hydrogen carbonate, or a mixture of any two or more thereof.

The concentrations, temperatures, and pH of the acidic and basic solutions may vary. In some embodiments, a concentration of the acidic solution is about 0.01 to 5 mol/L or 1 to 3 mol/L. In some embodiments, a temperature of the acidic solution is from about 25° C. to 100° C. or about 25° C. to 60° C. In other embodiments, a temperature of the basic solution is from about 25° C. to 100° C. or about 25° C. to 60° C. In some embodiments, a pH during the reaction of the acidic and basic solution is from about 5 to 12 or 7 to 9. Similarly, the concentration of the precipitating or chelating agent may vary. In some embodiments, a concentration of the precipitating or chelating agent is about 0.01 to 5 mol/L or about 1 to 3 mol/L. The stirring speed of the reaction of the acidic and basic solutions may also vary. In some embodiments, a stirring speed of the reaction of the acidic and basic solution is from about 50 to 5000 rpm or about 100 to 5000 rpm. Finally, the packing density of the nano-sized structured precursor may vary. In some embodiments, the packing density of the nano-sized structured precursor is from about 0.5 g/cm$^3$ to 4.0 g/cm$^3$ or from about 1.5 g/cm$^3$ to 3.0 g/cm$^3$.

The process may comprise other steps. In some embodiments, the process further comprises calcining the nano-sized structured precursor at about 100° C. to 1000° C. or at about 300° C. to 600° C. In other embodiments, the process comprises introducing a lithium source to the nano-sized structured precursor. In some embodiments, the introducing step is concurrent to calcining the nano-sized structure precursor at about 100° C. to 1000° C. In yet other embodiments, the calcining is at about 600° C. to 900° C. The lithium source may vary. In some embodiments, the lithium source is selected from lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, or a mixture of any two or more thereof. In still other embodiments, the step of introducing the lithium source is conducted in a dry or a wet mixer.

In another aspect, a method of coating any of the above materials is provided. In some embodiments, the method comprises exposing a material to a gas source in a furnace; and heating the gas source to deposit carbon on the material; wherein the gas source comprises a carbon source mixed with $CO_2$ gas in a furnace. In some embodiments, the material is a lithium titanate. In other embodiments, the heating is from about 100° C. to 1300° C. In still other embodiments, the carbon source is selected from acetylene, butane, 1,3 butadiene, 1-butene, cis-2-butene, trans-2-butene, 2,2-dimethylpropane, ethane, ethylene, hexane, heptane, isobutane, isobutylene, methane, 2-methylbutane, pentane, propane, propylene, octane, toluene, or a mixture of any two or more thereof. Also provided are any of the above materials comprising a carbon-coating.

In yet another aspect, electrochemical devices are provided. In some embodiments, the electrochemical device comprises a positive electrode comprising any of the above materials; a negative electrode; and a non-aqueous electrolyte. In some embodiments, the electrochemical device is a lithium secondary battery having the positive electrode and the negative electrode separated from each other by a porous separator. In other embodiments, the non-aqueous electrolyte comprises an alkali metal salt and a polar aprotic solvent. The alkali metal salt may be a lithium salt. The lithium salt may be selected from $Li[B(C_2O_4)_2]$, $Li(C_2O_4)BF_2$, $Li[PF_2(C_2O_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof. The polar aprotic solvent may be selected from ethylene carbonate, propylene carbonate, dimethyl carbonate, diethyl carbonate, ethyl methyl carbonate, dimethyl ether, gamma-butyrolactone, or a mixture of any two or more thereof.

DETAILED DESCRIPTION

In one aspect, nano-sized structured and spherical layered positive active materials are provided. It has been found that the sub-morphology and micro-texture of an active material may impart properties to the material that impact the electrochemical performance and packing density of the electrode, properties of which are known to impact battery performance. The nano-sized structured and spherical layered positive electrode materials can provide high specific capacity, increased packing density, and hence increased specific energy density, increased rate capability, and improved cycling performance.

The nano-sized structured and spherical layered positive active materials gain some of their properties from a combination of primary particles and secondary particles. The primary particles are a smaller particle that agglomerates to from a larger secondary particle. Typically, the primary particle is a particle on the nano-scale and may range in size from single digit nanometers to several hundred nanometers. Typically, from several primary particles to several hundred primary particles agglomerate to from the secondary particle that is larger, ranging from several hundred nanometers to the micron size.

Thus, in one embodiment, the active positive active material is a layered metal oxide of a plurality of primary particles agglomerated into a plurality of secondary particles. In such embodiments, the average primary particle size is from about 1 nm to 500 nm, from about 5 nm to 300 nm, in other embodiments, from about 5 nm to 200 nm, in other embodiments, or from about 10 nm to about 100 nm, in yet other embodiments. In such embodiments, the average secondary particle size is from about 1 µm to 100 µm, from about 1 µm to 30 µm, in other embodiments, from about 1 µm to 10 µm, in other embodiments, or from about 1 µm to 5 µm, in yet other embodiments.

The secondary particles also tend to be spherical, or at least the majority of the secondary particles are spherical. Therefore, greater than 50% of the secondary particles are spherical, or greater than 60% of the secondary particles are spherical, or greater than 70% of the secondary particles are spherical, or greater than 80% of the secondary particles are spherical, or greater than 90% of the secondary particles are spherical. In some embodiments, between 95% and 100% of the secondary particles are spherical.

The nano-sized structured and spherical layered positive active materials have the following general formula: $Li_{1+\alpha}(Ni_xCo_yMn_z)_{1-t}M_tO_{2-d}R_d$. In this general formula, M is selected from Al, Mg, Fe, Cu, Zn, Cr, Ag, Ca, Na, K, In, Ga, Ge, V, Mo, Nb, Si, Ti, Zr, or mixture of any two or more such metals; R is selected from F, Cl, Br, I, H, S, N, or a mixture of any two or more such elements; and $0 \leq \alpha \leq 0.50$, $0 < x \leq 1$, $0 \leq y \leq 1$, $0 < z \leq 1$, $0 \leq t \leq 1$, and $0 \leq d \leq 0.5$.

In other embodiments, the positive active material is a compound of formula $Li_{1+\alpha'}Ni_{x'}Co_{y'}Mn_{z''}O_{2-d'}F_{d'}$. In such other embodiments, α' is from 0 to 0.2, x' is from 0.1 to 0.6, z" is from 0.1 and 0.6, y' is from 0.01 to 0.4, and d' is from 0 to 0.1.

In some embodiments, the positive active materials have the formula $Li_{1+\alpha'Ni x'}Mn_zO_{2-d}F_{d'}$. In such embodiments, α' is from 0 to 0.2, x' is from 0.1 to 0.6, z' is from 0.2 to 0.6, and d' is from 0 to 0.1. In some embodiments, the material is $Li_{1.1}Ni_{0.2}Mn_{0.6}O_2$.

In another aspect, processes of preparing the positive active materials from transition metal precursors and chemical lithiation, are also provided. In such processes, precursor materials having a similar morphology to the positive active materials are prepared. Typically, metal carbonate precursors are used to make the positive active materials.

Dense, spherical nano-sized structured transition metal carbonate precursors are generally prepared via a co-precipitation method. The co-precipitation method involves dissolution of different transition metal salts in to water, separately, at a specified concentration. Typically an acidic solution and a basic solution are prepared, and a nano-sized structured precursor is then precipitated form a solution prepared by combining the acid and basic solutions. The basic solution typically includes a chelating or precipitatin agent. The separate solutions of metal salts are then combined and a transition metal oxide is precipitated. Typically, the total concentration of metal ions in the aqueous solution of the metal salts ranges from about 0.01 mol/L to 5 mol/L, or from about 1 to 3 mol/L. The temperature of the solutions may also impact precursor morphology, and as such the temperature is from about 20° C. to 150° C., from about 25° C. to 100° C., from about 25° C. to 80° C., or from about 25° C. to 60° C. In some embodiments, the temperature ranges from ambient temperature to about 60° C. The total concentration of precipitating agent is typically in the range of about 0.01 mol/L to 5 mol/L, or from about 1 to 3 mol/L. The pH value of the precipitating solutions was may range from about 5 to 12, or from about 7 to 9. Stirring speed of the solution from which the precursor materials are precipitated will also affect morphology and may range from about 50 rpm to 5000 rpm, from about 100 rpm to 2500 rpm, from about 300 rpm to 2000 rpm, or from about 500 rpm to 1500 rpm. The resulting nano-sized structured presursors may have a packing, or tap, density of the nano-sized structured precursor is from about 0.5 $g/cm^3$ to 4.0 $g/cm^3$, or from about 1.5 $g/cm^3$ to 3.0 $g/cm^3$.

After mixing, precipitation, and stirring, a wait time is initiated during stirring, prior to collection of a co-precipitated powder that will be the precursor material. Such wait times may range from about 1 hour to 10 hours, from about 1.5 hours to 8 hours, or from about 2 to 5 hours. The co-precipitated powder is then collected on a filter, washed, and then dried from about 25° C. to 120° C., in a vacuum oven.

As the particles begin to grow during the precipitation process, the precursor material grows from nano-sized seeds into a micron-sized secondary particle, typically about 1 µm to 50 µm in size, or from about 1 µm to 30 µm in size. However, secondary particles of the precursor may grow to sizes in excess of 50 µm. The pH of the solution may impact particle growth rate and size and may vary from about 5 to 12, or from about 7 to 9, in some embodiments.

In some aspects, the secondary particles that are prepared from the mixed transition metal carbonates precursors include from 1 to 300 nm, or more, nano-sized primary particles. The agglomeration of these primary particles, constitutes the spherical secondary bulky particles. In some embodiments, all of the primary particles may have the same chemical composition, or primary particles of different chemical compositions may be mixed to form the secondary particles. The composition of metal in the precursors includes metals such as, but not limited to, nickel, cobalt, manganese, aluminum, magnesium, iron, copper, zinc, chromium, silver, calcium, sodium, potassium, indium, gallium, germanium, vanadium, molybdenum, niobium chromium, silicon, titanium, zirconium, or mixtures of any two or more. Such metals may include ligand or anionic groups such as chloride, fluoride, bromide, iodide, carbonate, hydroxide, oxalate, acetate, nitrate, sulfate, phosphate, silicate, or mixtures of any two or more. In other embodiments, the concentration of the individual metal ion in the mixed metal solution, whenever other metal ions are present, can be adjusted to allow for the growth of primary spherical particles whose size range may vary from, but is not limited to, 1 to 300 nanometers.

In some embodiments, the metal carbonate precursor is $(Ni_xCo_yMn_z)_{1-t}M_tCO_{3-d}X_d$. In such embodiments, M is selected from Al, Mg, Fe, Cu, Zn, Cr, Ag, Ca, Na, K, In, Ga, Ge, V, Mo, Nb, Si, Ti, Zr, or a mixture of any two or more such metals; and X is selected from F, Cl, Br, I, H, S, N, or a mixture of any two or more elements; $0 < x \leq 1$; $0 \leq y \leq 1$; $0 < z \leq 1$; $0 \leq t \leq 1$; and $0 \leq d \leq 1$.

In some embodiments, the preparation of the acidic solution includes dissolving a metal precursor salt, $M'_\delta X'_\gamma$, in distilled water or an organic solvent; where M' is selected from Ni, Co, Mn, Al, Mg, Fe, Cu, Zn, V, Mo, Nb, Cr, Si, Ti, Zr, or a mixture of any two or more; X' is selected from $NO_3^-$, $SO_4^{2-}$, $CO_3^{2-}$, $PO_4^{3-}$, $F^-$, $Cl^-$, $Br^-$, $I^-$, or a mixture of any two more; $1 \leq \delta \leq 3$; and $1 \leq \gamma \leq 3$. In some embodiments, M' is Ni, Co, Mg, or a mixture of any two or more.

In some embodiments, the precipitating agent may be, but is not limited to, sodium carbonate, sodium hydrogen carbonate, sodium fluoride ammonium carbonate, ammonium hydrogen carbonate, sodium hydroxide, potassium hydroxide, lithium hydroxide, ammonium hydroxide, sodium oxalate, sodium hydrogen oxalate, ammonium fluoride, or a mixture of any two or more such materials. The total concentration of precipitating agent ranges from about 0.05 M to 5 M, in some embodiments. In other embodiments, the concentration of precipitating agent is from about 0.1 M to 3 M, or from about 0.2 M to 2 M. The combined solution is kept at a constant temperature in the range of about 25° C. to 100° C. during the precipitation process. In some embodiments, the temperature ranges from about 40° C. to 70° C.

Typically, the spherical particles are then calcined from about 100° C. to 1000° C. to form the mixed transition metal, spherical precursor materials, prior to lithium introduction. As used herein, "calcining" refers to heating a material at a designated temperature in either an inert atmosphere, in air, or under a reducing atmosphere. In some embodiments, the inert atmosphere is helium, argon, nitrogen, or a mixture of any two or more such inert gases. Reducing atmospheres may be provided by hydrogen gas. In some embodiments, the calcination is conducted from about 300° C. to 600° C.

Lithium is then diffused into the particles either during or after calcination of the precursors. The lithium may be introduced concurrently to calcining the nano-sized structured precursor at about 100° C. to 1000° C., or from about 600° C. to 900° C. The process of lithium diffusion within the secondary particles of the mixed metal carbonate precursors during the lithiation process is impacted by the growth of the primary particles. In some embodiments, the lithiation process may lead to homogenous, nano-sized primary particles whose range is between 50 and 100 nanometers.

In some embodiments, nano-sized primary particles can be adjusted to have the same or different chemical composition from the native materials in the bulk or on the surface of particles. The adjustment process herein can be introduced during the preparation of precursors, or during the process of lithiation, or during a process of etching or coating using, but is not limited to, mechanical, or chemical, or electrochemical method, or other morphology modification techniques such as sputtering, laser ablation, chemical vapor deposition or mixture methods thereof.

In some embodiments, the lithium metal sources may be chosen from lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, or a mixture of any two or more such lithium materials. The lithium source may be combined with the precursor materials in either a wet or a dry mixer.

In other embodiments, the lithium diffusion during the process of lithiation of the nano-sized structured carbonate precursors may or may not reach the center of the secondary particles of the mixed metal carbonate precursors. In all aspects, the lithium diffusion during the process of lithiation of the nano-sized structured carbonate precursors may increase the size of the primary particles from the range of 1-300 nanometers to the range of 20-1000 nanometers without destroying the morphology of the secondary particles.

The nano-sized structured and spherical layered positive active materials have the following general formula: $Li_{1+\alpha}(Ni_xCo_yMn_z)_{1-t}M_tO_{2-d}R_d$. In this general formula, M is selected from Al, Mg, Fe, Cu, Zn, Cr, Ag, Ca, Na, K, In, Ga, Ge, V, Mo, Nb, Si, Ti, Zr, or mixture of any two or more such metals; R is selected from F, Cl, Br, I, H, S, N, or a mixture of any two or more such elements; and $0 \leq \alpha \leq 0.50$, $0 < x \leq 1$, $0 \leq y \leq 1$, $0 < z \leq 1$, $0 \leq t \leq 1$, and $0 \leq d \leq 0.5$.

In some embodiments, the nano-sized structured dense and spherical layered positive active material is $Li_{1+\alpha}(Ni_xCo_yMn_z)_{1-t}M_tO_{2-d}R_d$, where M is Al, Mg, Fe, Cu, Zn, Cr, Ag, Ca, Na, K, In, Ga, Ge, V, Mo, Nb, Si, Ti, Zr, or a mixture of any two or more such metals; R is F, Cl, Br, I, H, S, N, or a mixture of any two or more such elements; and $0 < \alpha \leq 0.5$, $0 < x \leq 1$, $0 \leq y \leq 1$, $0 < z \leq 1$, $0 \leq t \leq 1$, and $0 \leq d \leq 1$. In some embodiments, the positive active material is a composite formula of $\beta LiMe'O_2 \cdot (1-\beta)Li_2Me''O_3$, where $0 < \beta < 1$, and where Me' is one or more ions having an average oxidation state of three with at least one ion being Ni, and where Me" is one or more ions having an average oxidation state of four with at least one ion being Mn. The $LiMe'O_2$ and $Li_2Me''O_3$ components are layered and the ratio of Li to Me' and Me" is greater than one but less than two.

The lithium content, after decomposition of the lithium metal source, may be chosen to partially, or completely, lithiate the secondary particles of the mixed metal carbonate precursors per the targeted chemical stoichiometry. In some embodiments, the lithium content may be chosen to lithiate the spherical secondary particles within the molar ratio range of lithium/metal of 0.1 to 10. The "metal" as used in the ratio refers to the total metals in the secondary spherical nano-sized structured precursor particles. In all aspects, the lithium content, lithium metal source, lithiation processes or combination thereof may be chosen to impact the size of the primary particles, packing density, structure, and specific capacity of the resulting lithiated metal oxides as well as the energy density, power capability, and cycle life of the cell constructed from such materials.

In some embodiments, the nano-sized structured metal carbonate precursor $(Ni_xCo_yMn_z)_{1-t}M_tCO_{3-d}X_d$ is subjected to a carbon coating process. The same carbon coating process may be used to coat nano-sized structured dense and spherical layered positive active materials such as $Li_{1+\alpha}(Ni_xCo_yMn_z)_{1-t}M_tO_{2-d}R_d$. To carbon-coat the materials, a preheated furnace or fluidized bed reactor, containing the precursor, is fed with a carbon source gas. The carbon source gas is any carbon-containing material that is a gas under the experimental conditions and that decomposes at a predetermined temperature to generate carbon material. The carbon source gas may have from 1 to about 20 carbon atoms. Examples include, but are not limited to, propylene, acetylene, butane, 1-3 butadiene, 1-butene, cis-2-butene, trans-2-butene, 2-2-dimethylpropane, ethane, ethylene, isobutane, isobutylene, methane, propane, toluene, pentanes, hexanes, heptanes, and octanes. Mixtures of two or more carbon source gases may be used, and each may have a different cracking temperature. Optionally, the carbon source gas may be mixed with $CO_2$ to raise the oxidation potential of the gas phase as the carbon is deposited on the $(Ni_xCo_yMn_z)_{1-t}M_tCO_{3-d}R_d$ precursors or the $Li_{1+\alpha}(Ni_xCo_yMn_z)_{1-t}M_tO_{2-d}R_d$ lithiated compounds. One such exemplary carbon source mixture and temperature is a mixture of 97% $CO_2$ gas and 3% propylene, by weight, at a deposition temperature of 700° C.

The flow rate of the gas, the temperature of the cracking, and the estimated reaction time are dependant upon the ratio of the precursor used, or lithiated compounds used, to the desired amount of carbon. For example, the cracking process of propylene begins at approximately 400° C., therefore the temperature for coating a precursor may be chosen to be between about 100° C. and 1300° C. The exemplified ratio of $CO_2$ to propylene is not intended to be limiting in any way, but is an example of many such ratios that will be readily apparent to one of skill in the art.

In some embodiments, the carbon-coating process is conducted inside a rotatory reactor furnace comprising a fused quartz vessel within a stainless steel cage having a gas outlet and controlled by a controller unit. Alternatively, other furnaces such as a fluidized bed furnace or static furnace may be used. The coating time and the gas flow rate may be chosen to produce the desired precursor or lithiated compounds herein/carbon ratio. For example, if the gas flows were fixed, only the time would be varied to apply a thicker or thinner coating.

In another aspect, electrodes, cells, and/or batteries prepared using the dense, nano-sized structured and spherical layed positive materials are provided. In some embodiments, the method to make electrodes from the spherical lithiated precursors is provided for use in an electrochemical device. Typically, the electrodes made from the disclosed materials are cathodes (i.e. the positive electrode of an electrochemical cell). Exemplary electrochemical devices have at least a cathode; an anode; and a non-aqueous electrolyte. The non-aqueous electrolyte may be any conventional or otherwise suitable organic electrolyte known in the art. In some embodiments, the electrochemical device is a lithium secondary battery. In other embodiments, the cathode is a lithium metal oxide as described herein. In yet other embodiments, the anode is graphite, amorphous carbon, $Li_4Ti_5O_{12}$, tin alloys, silicon alloys, intermetallic compounds, lithium metal, or mixtures of any two or more such materials. Suitable graphitic materials may include, but are not limited to, natural graphite, artificial graphite, graphitized meso-carbon microbeads, graphite fibers, or a mixture of any two or more thereof, as well as any amorphous carbon materials. Also, typically in an electrochemical device, the anode and cathode are separated from each other by a porous separator.

Suitable non-aqueous electrolytes for use in the lithium ion batteries include an alkali metal salt and a polar aprotic solvent. In some embodiments, the alkali metal salt is a lithium salt, such as, but not limited to, $Li[B(C_2O_4)_2]$, $Li(C_2O_4)BF_2$, $Li[PF_2(C_2O_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more. The polar aprotic solvent may include, but is not limited to, ethylene carbonate, propylene carbonate, dimethyl carbonate, diethyl carbonate, ethyl methyl carbonate, dimethyl ether, gamma-butyrolactone, or a mixture of any two or more.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The inventions illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

General Procedures

Dense, spherical nano-sized structured nickel, manganese and cobalt carbonate precursors, are generally prepared via the following co-precipitation method: an appropriate amount of nickel sulfate (alternatively, nickel nitrate, nickel acetate, nickel oxalate, nickel chloride, or a mixture of any two such nickel materials), manganese sulfate (alternatively, manganese nitrate, manganese acetate, manganese oxalate, manganese chloride, or a mixture of any two such manganese materials), and cobalt sulfate (alternatively, cobalt nitrate, cobalt acetate, cobalt oxalate, cobalt chloride, or a mixture of any two such cobalt materials) are dissolved in distilled water. Typically, the total concentration of metal ions in the aqueous solution of the metal salts ranges from about 0.01 mol/L to 5 mol/L and the temperature of the metal solutions may vary from about 25° C. to 80° C. Other metals such as aluminum, magnesium, iron, copper, zinc, vanadium, molybdenum, niobium chromium, silicon, titanium, zirconium, or mixture of any two such materials, may be co-precipitated with the nickel, manganese, and cobalt solution to make dense, spherical nano-sized structured carbonate precursors. The precipitating agent may be sodium carbonate, sodium hydrogen carbonate, ammonium carbonate, ammonium hydrogen carbonate, sodium hydroxide, potassium hydroxide, lithium hydroxide, ammonium hydroxide, sodium oxalate, sodium hydrogen oxalate, or mixture of any two such materials. In some cases, a mixture of sodium fluoride and either sodium carbonate or sodium hydrogen carbonate are used. In other cases, a mixture of ammonium fluoride and ammonium carbonate or ammonium hydrogen carbonate is used.

The total concentration of precipitating agent is typically in the range of about 0.05 mol/L to 5 mol/L. The combined solution is kept at a constant temperature in the range of about 25° C. to 80° C. during the co-precipitation process. The pH value of the precipitating solutions was varied from about 7 to 9. The stirring speed of the solution was varied from about 500 rpm to 1500 rpm. The wait time, initiated at the beginning of the reaction to the collection of the precipitants, may vary between 2 to 5 hours. The co-precipitated powder is then washed, filtered, and dried from about 25° C. to 120° C. in a vacuum oven.

In some cases, the spherical nano-sized structured mixed metal carbonate precursors are first heat-treated before lithiation takes place so that a lithium source can be added to an oxide form of the precursor to facilitate lithium diffusion. In such cases, the temperature for this initial heat treatment may vary from about 200° C. to 700° C.

To form lithium mixed metal oxides from metal carbonate precursors, lithium metal sources are chosen from lithium carbonate, lithium hydroxide, lithium nitrate, lithium acetate, lithium oxalate, lithium benzoate, lithium fluoride, lithium chloride, lithium bromide, lithium iodide, lithium oxide, lithium peroxide, lithium sulfate, lithium alloys, lithium silicate, lithium aluminate, lithium phosphate, or mixtures of any two or more such lithium materials. The mixing of the spherical nano-sized structured nickel manganese and cobalt carbonate precursors with the lithium metal source can be done inside an apparatus that allows for a dry mixing over approximately 24 hours. The mixed powder can be calcined from about 100° C. to 1000° C. for 6 to 48 hours in an air, an inert, an oxidizing, or a slightly reducing atmosphere. The calcination rate can vary from about 0.5° C./min to 20° C./min.

Positive electrodes are made by coating a paste of lithium mixed metal oxide active material(s), carbon (as a conducting additive), and polyvinylidene fluoride (PVdF, binder) on an aluminum foil collector. The electrolyte is 1.2 mol/L LiPF$_6$ in a (3:7 wt %) mixture of ethylene carbonate (EC) and ethyl methyl carbonate (EMC). The reference and counter electrode is lithium metal. The lithium/lithium mixed metal oxides cells are assembled inside a helium-filled dry-box and are evaluated using coin-type cells (CR2032: 1.6 cm$^2$).

Example 1

Dense, spherical, nano-sized structured (Ni$_x$Co$_y$Mn$_z$)CO$_3$ (0<x≦1, 0≦y≦1), 0<z≦1) carbonate precursors were prepared from a 2 mol/L acidic solution of nickel sulfate, nickel sulfate, and manganese sulfate in distilled water in the appropriate proportions, and a 2 mol/L basic solution of sodium carbonate mixed with 0.2M solution of ammonium hydroxide, as the chelating agent. The acidic metal solution was prepared at 50° C. until the metal salts completely dissolved.

Figure 1:
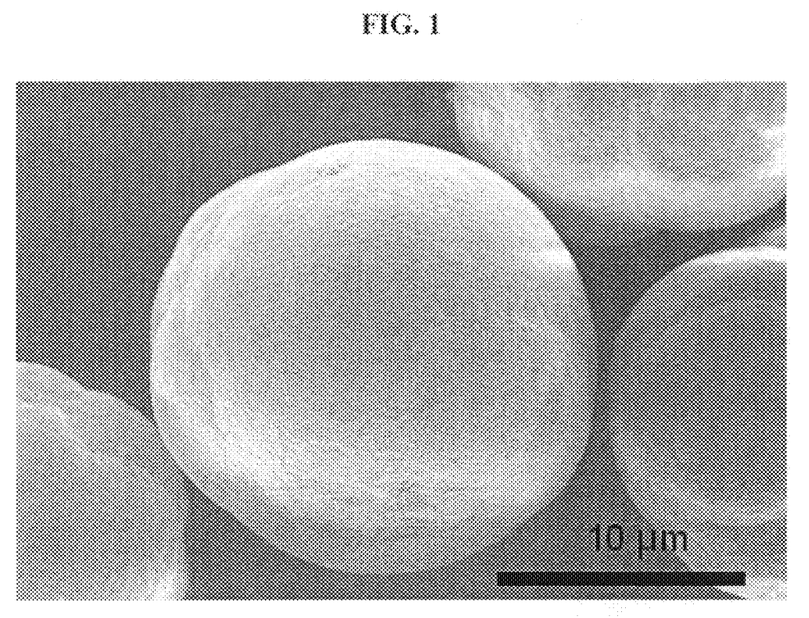
FIG. 1 is an SEM image (×4,000) of a carbonate precursor, $(Ni_{0.25}Mn_{0.75})CO_3$, as prepared in Example 1. The material was obtained by co-precipitation of a 2 mol/L acidic solution of $NiSO_4$ and $MnSO_4$, and a 2 mol/L basic solution of $Na_2CO_3$ with 0.2M solution of $NH_4OH$ and a rest time of 5 hours, before collection.
Figure 2:
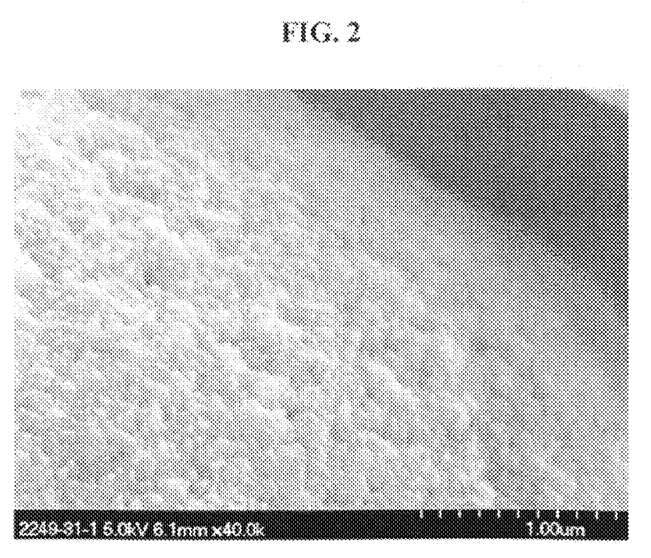
FIG. 2 is an SEM image (×40,000) of $(Ni_{0.25}Mn_{0.75})CO_3$, as prepared in example 1.
Figure 3:
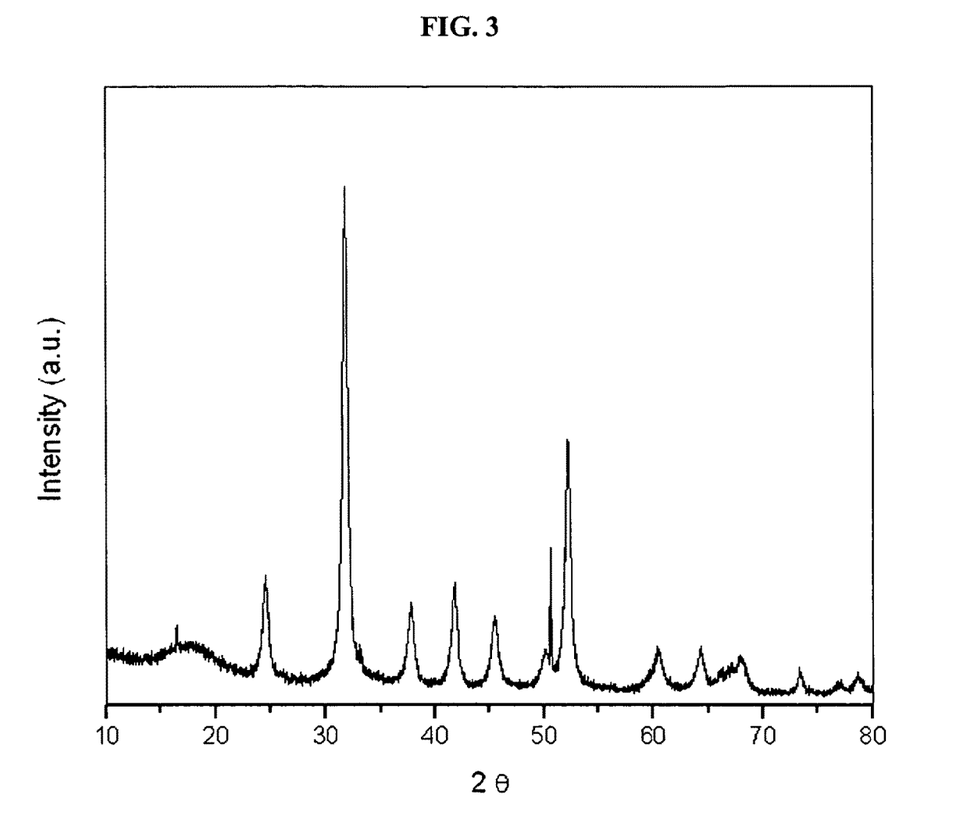
FIG. 3 is an x-ray powder diffraction pattern of a $(Ni_{0.25}Mn_{0.75})$, as prepared in example 1.

One example of the targeted chemical composition was (Ni$_{0.25}$Mn$_{0.75}$)CO$_3$, prepare as described above with a wait time of 5 hours. This material was characterized using SEM imaging and powder diffraction. FIG. 1 shows an SEM image (×4,000) of the dense and spherical morphology with an average secondary particle size of approximately 15 μm. FIG. 2 shows a magnified SEM image (×40,000) of the surface of the (Ni$_{0.25}$Mn$_{0.75}$)CO$_3$ precursor shown in FIG. 1. In FIG. 2, a homogenous and dense surface texture is observed with primary particle sizes ranging from 1 to 300 nm. FIG. 3 shows an x-ray powder diffraction pattern of the co-precipitated (Ni$_{0.25}$Mn$_{0.75}$)CO$_3$ precursor. The diffraction lines of (Ni$_{0.25}$Mn$_{0.75}$)CO$_3$ similar to the diffraction lines of MnCO$_3$ and CoCO$_3$ that can be indexed according to the space group R$\bar{3}$c. This clearly demonstrates that the (Ni$_{0.25}$Mn$_{0.75}$)CO$_3$ precursor is a pure and single-phase metal carbonate with a very homogenous cation distribution.

Example 2

Lithiated compounds Li$_{1+t}$(Ni$_x$Co$_y$Mn$_z$)O$_2$ (0<x≦1, 0≦y≦1, 0<z≦1, 0≦t≦0.5) are, in general, materials that are able to provide high specific capacity, high discharge voltage, and thus high energy density electrode active materials. One example of the targeted chemical composition was Li$_{1.1}$Ni$_{0.2}$Mn$_{0.6}$O$_2$. To prepare such compositions, appropriate amounts of Li$_2$CO$_3$, lithium hydroxide, lithium fluoride, and (Ni$_{0.25}$Mn$_{0.75}$)CO$_3$ (as prepared in Example 1) were mixed for over 24 hours in a dry mixer apparatus. The mixture was calcined at 600° C. for 15 hours in air to decompose the carbonate and release carbon dioxide. The resulting powder was further mixed and thereafter calcined at 900° C. for 20 hours in air to allow the lithiation process to take place.

Figure 4:
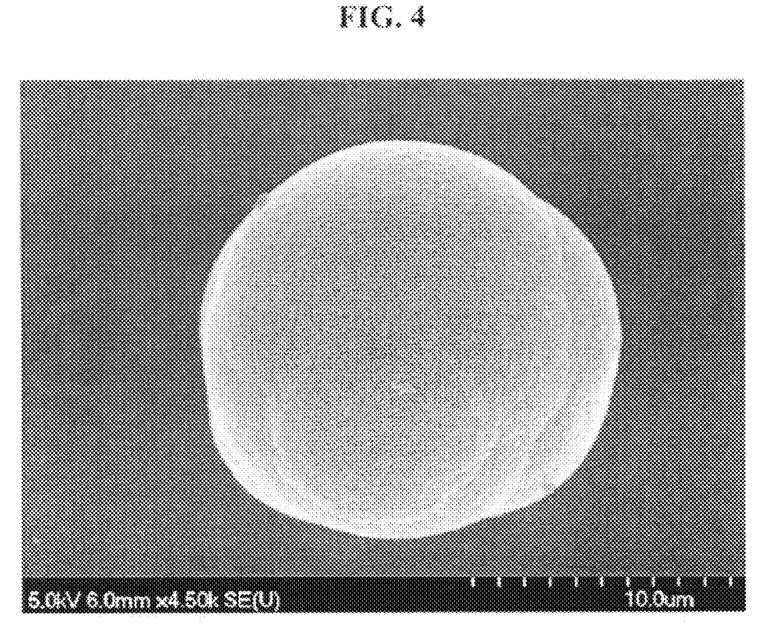
FIG. 4 is an SEM image (×4,500) of a lithiated carbonate precursor $Li_{1.1}Ni_{0.2}Mn_{0.6}O_2$, as prepared in Example 2. The material was prepared by a process that allows for the growth of 50-100 nano-sized structured primary particles during the reaction of a lithium metal source and the $(Ni_{0.25}Mn_{0.75})CO_3$. The metal oxides were reacted for 20 hours at 900° C., as prepared in example 1.
Figure 5:
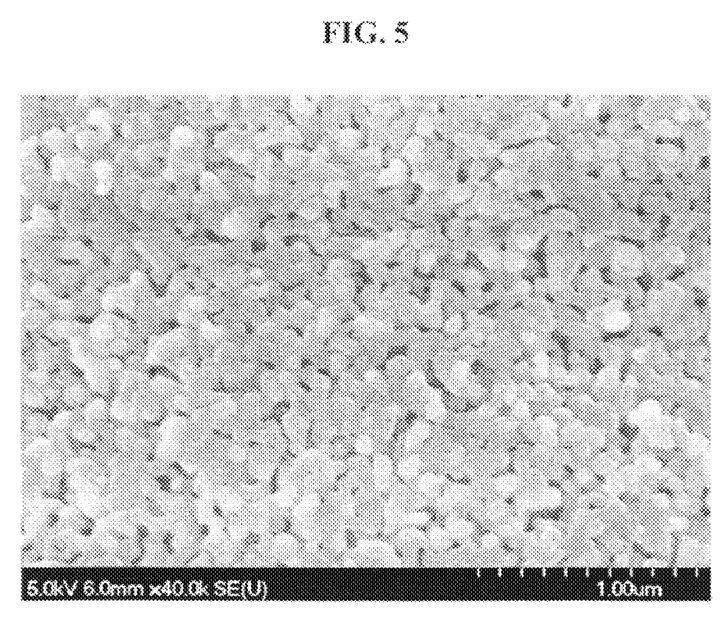
FIG. 5 is an SEM image (×40,000) of $Li_{1.1}Ni_{0.2}Mn_{0.6}O_2$, as prepared in example 1.
Figure 6:
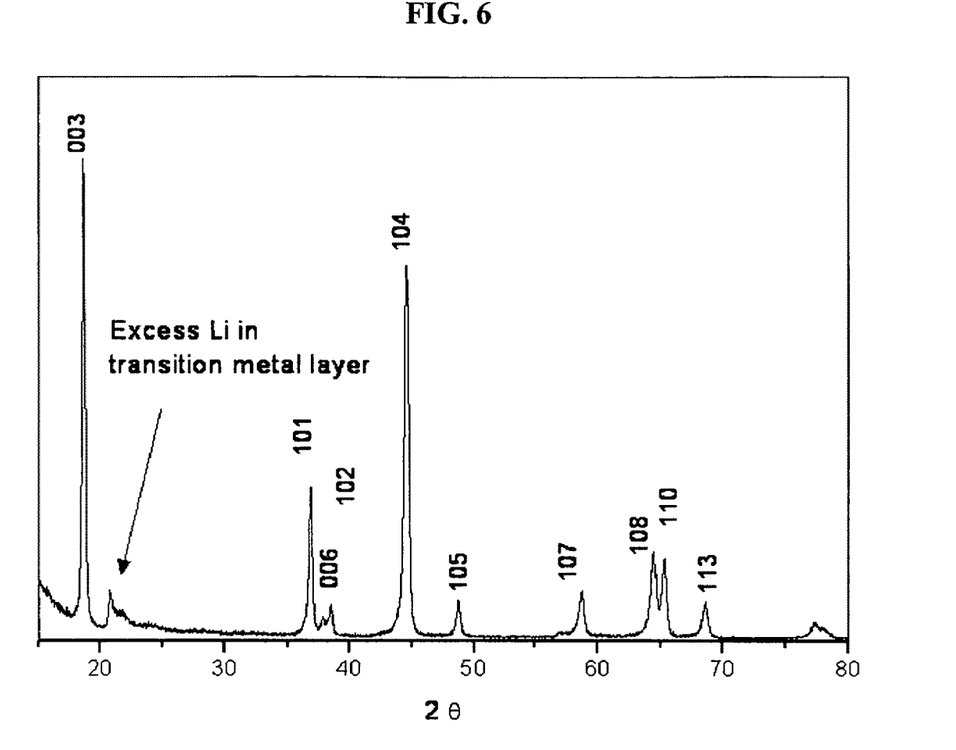
FIG. 6 is an x-ray powder diffraction pattern of $Li_{1.1}Ni_{0.2}Mn_{0.6}O_2$, as prepared in example 1.

The SEM image depicted in FIG. 4 shows that the lithiated material Li$_{1.1}$Ni$_{0.2}$Mn$_{0.6}$O$_2$ retains the spherical morphology and particle size of the metal carbonate precursors (15 μm secondary particle size). A magnified SEM surface image (×40,000) of the particle is shown in FIG. 5. Between 50 and 100 nano-sized primary particles are found to be evenly distributed on the surface of the particle forming a homogenous dense primary particles network. These morphological characteristics result in a high packing density, 2.05 g/cm$^3$, of the material. FIG. 6 shows the x-ray power diffraction pattern of the Li$_{1.1}$Ni$_{0.2}$Mn$_{0.6}$O$_2$. The material can be indexed according to a α-NaFeO$_2$ (R$\bar{3}$m space group) structure with additional small peaks at approximately 22° corresponding to the existence of some lithium ions in the transitional metal layer occupied by nickel and manganese ions. The x-ray pattern demonstrates that the lithiated compound possess a single-phase lithium metal oxide structure where lithium ions are located in planes parallel to subsequent planes occupied by nickel, manganese, and an excess of lithium ions.

Figure 7:
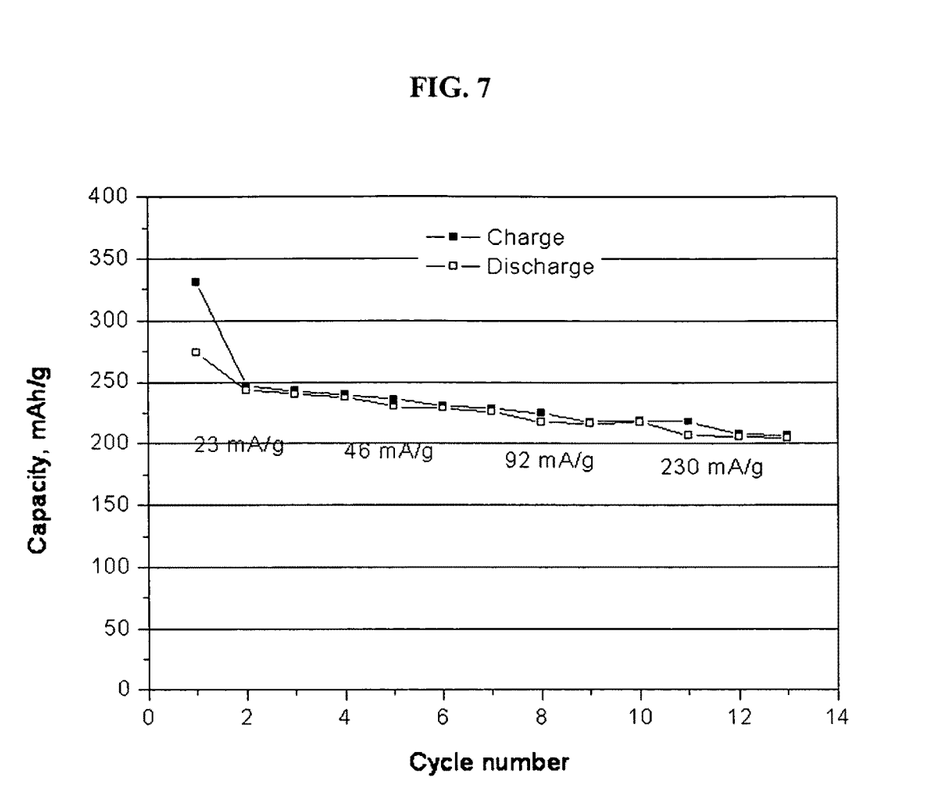
FIG. 7 is a graph illustrating the rate capability characteristics of a $Li/Li_{1.1}Ni_{0.2}Mn_{0.6}O_2$ cell constructed with lithiated $((Ni_{0.25}Mn_{0.75})CO_3$ carbonate precursort, as prepared in Example 2.
Figure 8:
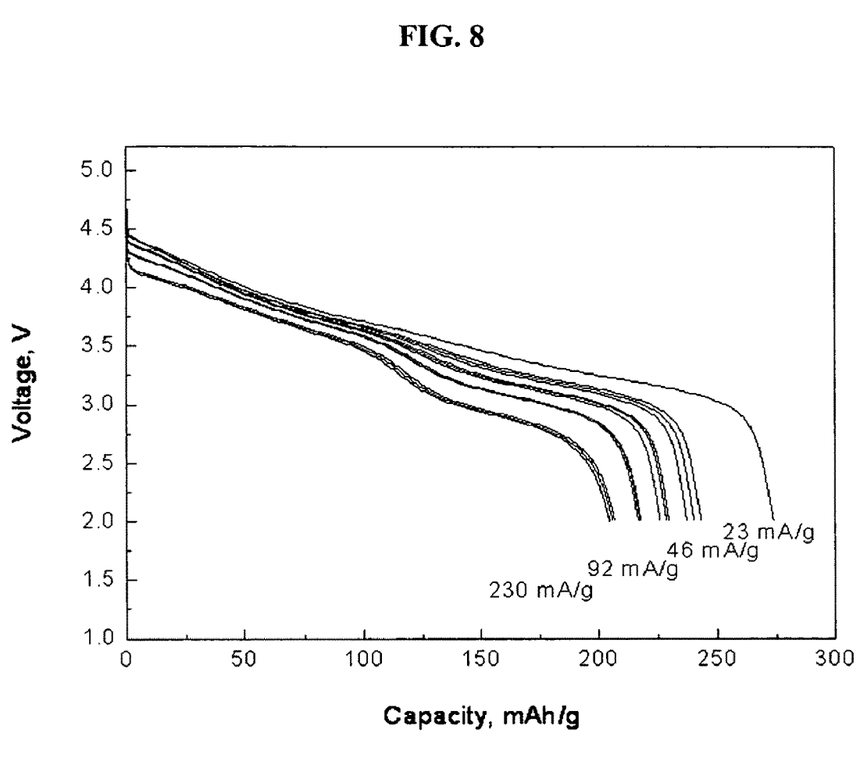
FIG. 8 is a discharge voltage profile vs. capacity graph for a $Li/Li_{1.1}Ni_{0.2}Mn_{0.6}O_2$ cell constructed with a lithiated $(Ni_{0.25}Mn_{0.75})CO_3$ carbonate precursor, as prepared in Example 2.
Figure 9:
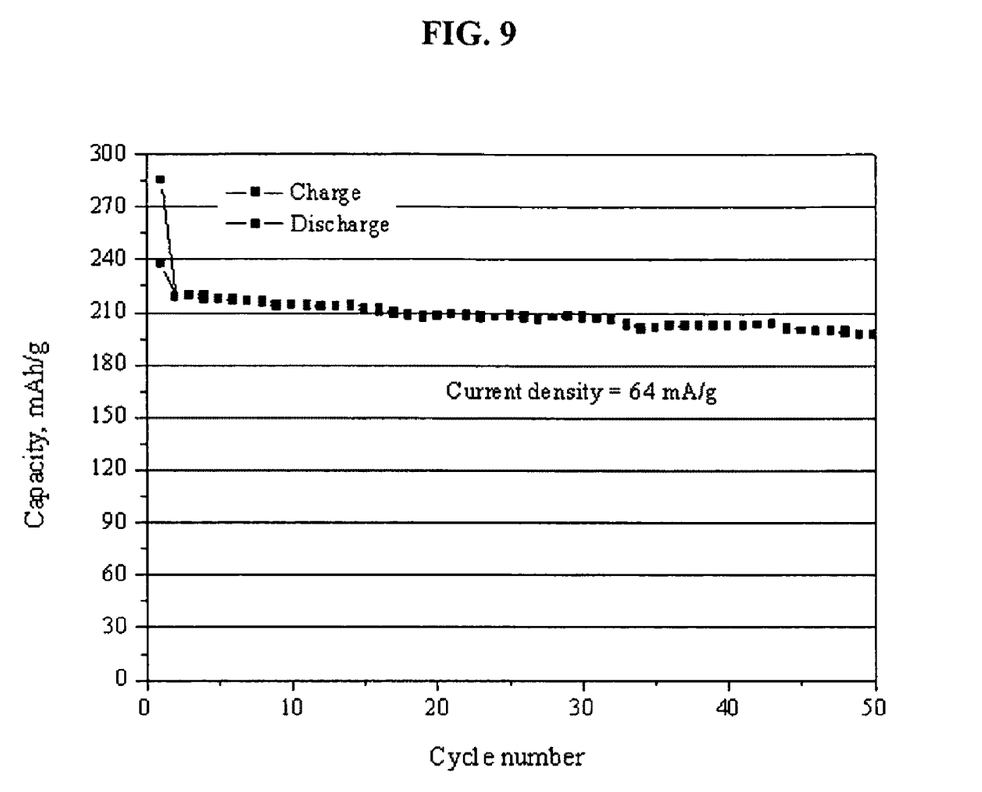
FIG. 9 is the specific capacity vs. cycle number graph for a $Li/Li_{1.1}Ni_{0.2}Mn_{0.6}O_2$ cell constructed with a lithiated $(Ni_{0.25}Mn_{0.75})CO_3$ carbonate precursor, as prepared in Example 2.

Li$_{1.1}$Ni$_{0.2}$Mn$_{0.6}$O$_2$ active material was tested in a Li/Li$_{1.1}$Ni$_{0.2}$Mn$_{0.6}$O$_2$ structured electrochemical cells comprising a positive electrode, a negative electrode, and a non-aqueous electrolyte. The positive electrode consisted of 80 wt % lithium metal oxide powder, 10 wt % carbon, and 10 wt % PVDF binder on aluminum foil. The negative electrode was metallic lithium. The non-aqueous electrolyte was 1.2 mol/L LiPF$_6$ in a 3:7 wt % mixture of ethylene carbonate (EC) and ethyl methyl carbonate (EMC) solvents. FIG. 7 shows the rate capability characteristics of this Li/Li$_{1.1}$Ni$_{0.2}$Mn$_{0.6}$O$_2$ cell. The cell was cycled between 2 and 4.6V at increasing charge/discharge current densities after activation at 4.9V during the first cycle. Cycles 2 through 4 were performed at a constant current density of 23 mA/g, cycles 5 through 7 were performed at a constant current density of 46 mA/g, cycles 8 through 10 were performed at a constant current density of 92 mA/g, and cycles 11 through 13 were performed at a constant current density of 230 mA/g. The first discharge capacity was 275 mAh/g at a constant current density of 23 mA/g. An 84% capacity can be retained when the charge/discharge current density increased from 23 mA/g (2$^{nd}$ cycle) to 230 mA/g (13$^{th}$ cycle). The initial capacity loss during the first cycle was 58 mAh/g which can be translated to 83% initial coulombic efficiency. FIG. 8 shows the discharge voltage profile vs. capacity of the Li/Li$_{1.1}$Ni$_{0.2}$Mn$_{0.6}$O$_2$ cell. FIG. 9 is the specific capacity vs. cycle number of the Li/Li$_{1.1}$Ni$_{0.2}$Mn$_{0.6}$O$_2$ cell. The cycling characteristic of the cell based on this material shows no significant capacity fading at a constant current density of 63 mA/g with a 200 mAh/g capacity retention after 50 cycles.

Example 3

Another targeted chemical composition was Li$_{1.3}$Ni$_{0.2}$Mn$_{0.6}$O$_2$. To prepare such a composition, stoichiometric amounts of lithium carbonate, lithium hydroxide, lithium fluoride, and (Ni$_{0.25}$Mn$_{0.75}$)CO$_3$ (as prepared in example 1) were well mixed for over 24 hours in a dry mixer apparatus. The mixture was calcined at 600° C. for 15 hours in air to decompose the carbonate and release carbon dioxide. The resulting powder was then further mixed and thereafter calcined at 900° C. for 20 hours in air to allow for completion of the lithiation process.

Figure 10:
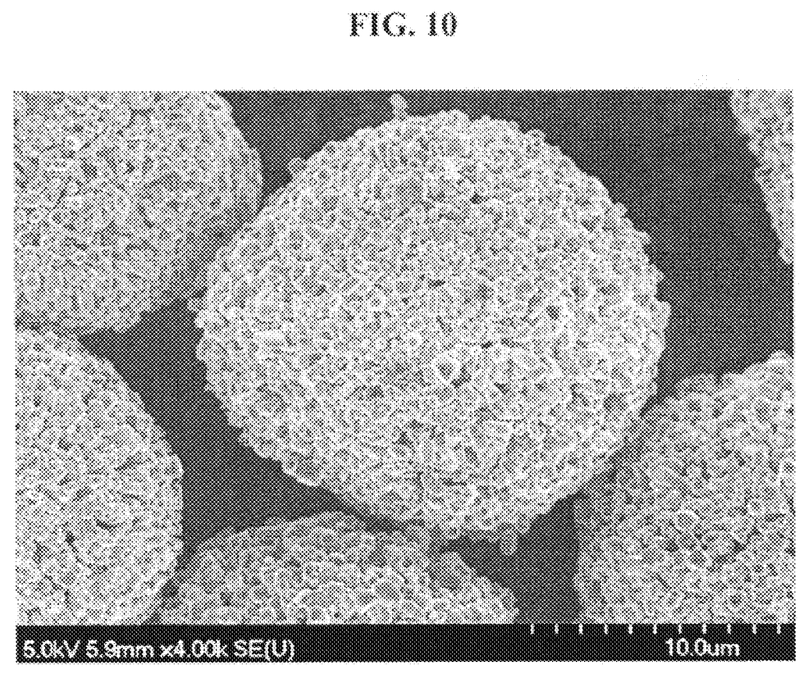
FIG. 10 is an SEM image (×4,000) of $Li_{1.3}Ni_{0.2}Mn_{0.6}O_2$, as prepared in Example 3.
Figure 11:
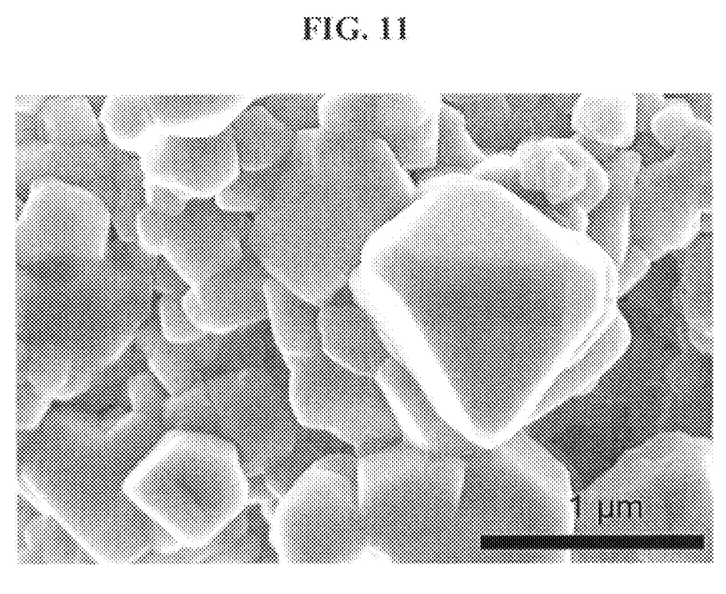
FIG. 11 is an SEM image (×40,000) of $Li_{1.3}Ni_{0.2}Mn_{0.6}O_2$, as prepared in Example 3.
Figure 12:
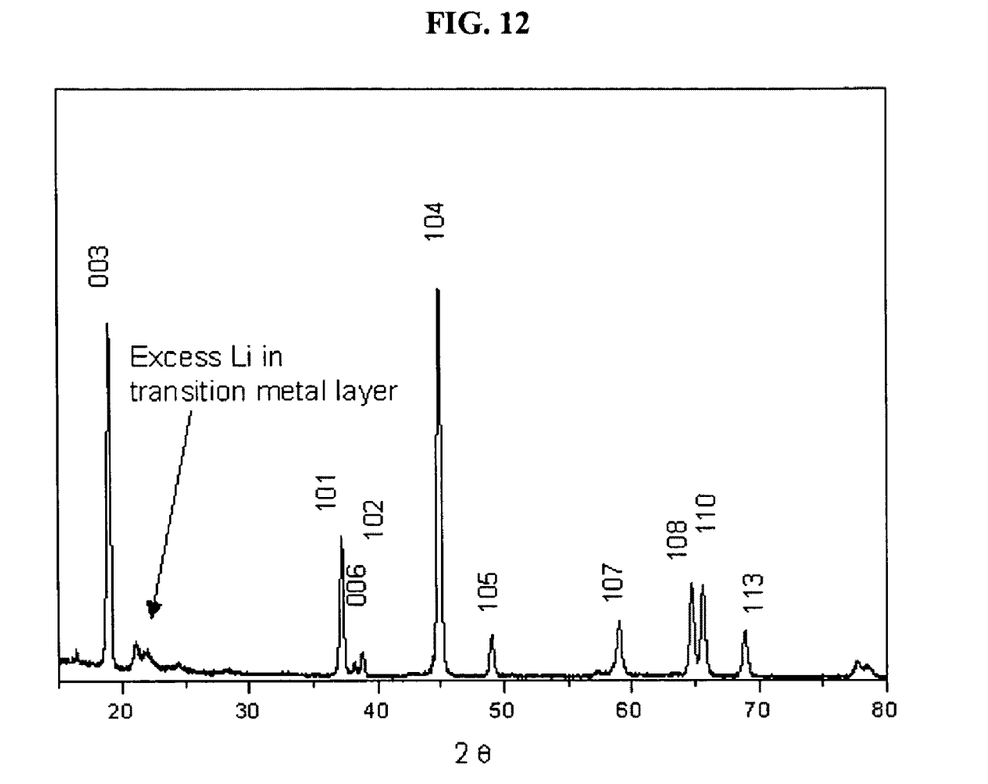
FIG. 12 is an X-ray powder diffraction pattern of $Li_{1.3}Ni_{0.2}Mn_{0.6}O_2$, as prepared in Example 3.
Figure 13:
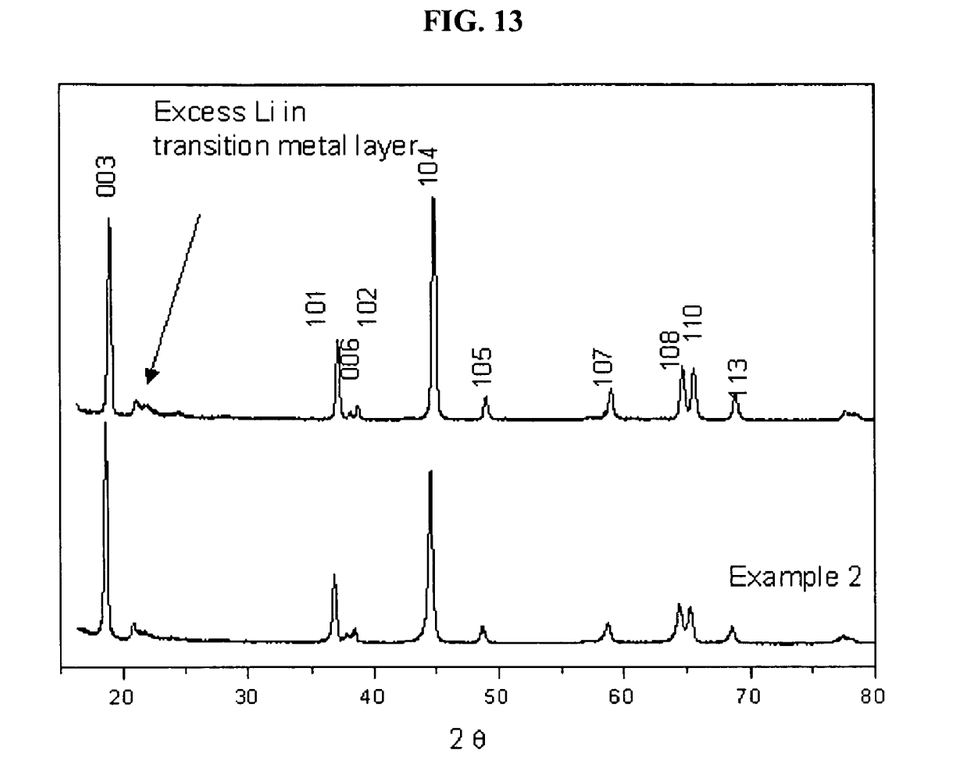
FIG. 13 is a comparison of the x-ray powder diffraction patterns of $Li_{1.1}Ni_{0.2}Mn_{0.6}O_2$ and $Li_{1.3}Ni_{0.2}Mn_{0.6}O_2$.

The SEM image depicted in FIG. 10 shows that Li$_{1.3}$Ni$_{0.2}$Mn$_{0.6}$O$_2$ retains the spherical morphology and particle size of the metal carbonate precursors (15 μm). A magnified SEM surface image (×40,000) of the particle is shown in FIG. 11. Micro-sized primary particles ranging from 0.3 to 1 μm were found to be distributed on the surface of the particle, thereby forming a non-homogenous primary particle network. The larger primary particles distributed on the particle surface had led to a lower packing density of the material of 1.7 g/cm$^3$. Without being bound by theory, the lower packing density of this material likely resulted from the large space created between the large and rough primary particles in the bulk and on the surface of the secondary particles. FIG. 12 shows the x-ray power diffraction pattern of $Li_{1.3}Ni_{0.2}Mn_{0.6}O_2$ material as prepared above. No significant differences are noticed between $Li_{1.3}Ni_{0.2}Mn_{0.6}O_2$ and $Li_{1.1}Ni_{0.2}Mn_{0.6}O_2$ (see FIG. 13). $Li_{1.3}Ni_{0.2}Mn_{0.6}O_2$ is a single-phase lithium metal oxide having a α-NaFeO$_2$ structure with additional small peaks at approximately 22° corresponding to the ordering of access lithium ions in the transitional metal layer. Therefore, it is not likely that the difference of the size of the primary particles and their networking in the bulk and on the surface of the secondary particles accounts for any substantial structural changes.

Figure 14:
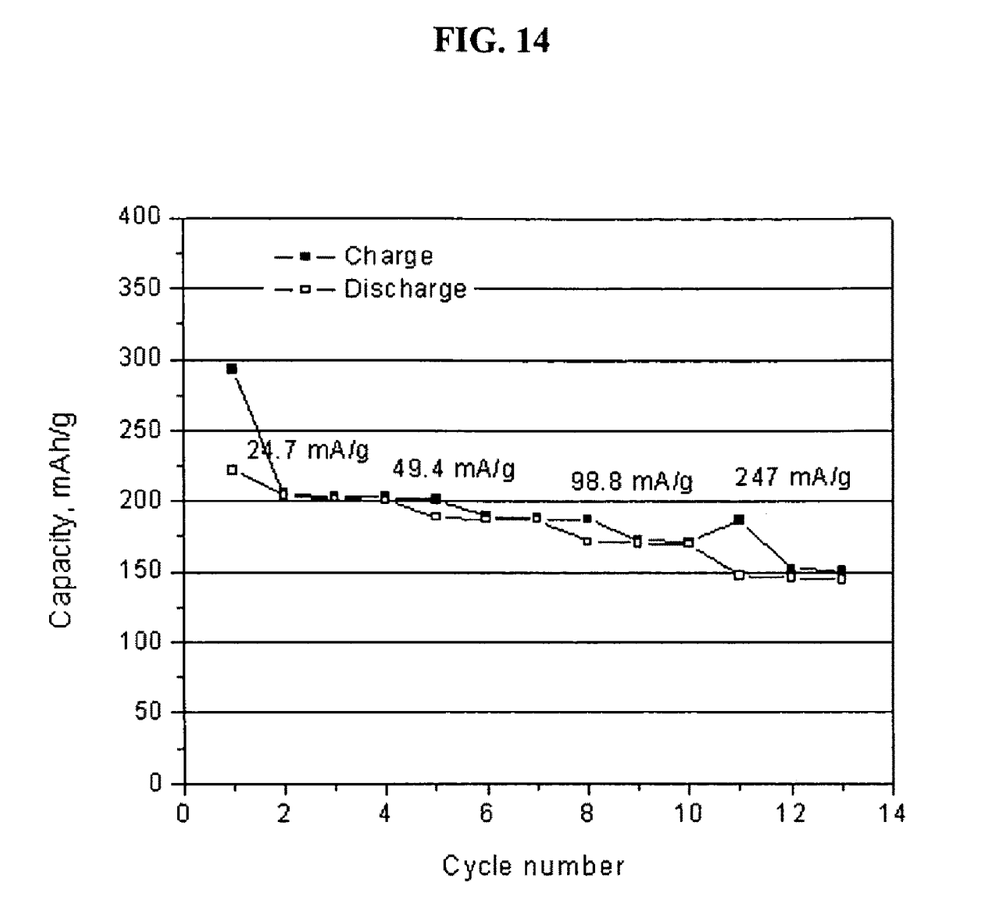
FIG. 14 is a rate capability graph of a $Li/Li_{1.3}Ni_{0.2}Mn_{0.6}O_2$ cell constructed with a lithiated $(Ni_{0.25}Mn_{0.75})CO_3$ precursor.

$Li_{1.31}Ni_{0.2}Mn_{0.6}O_2$ was tested in a $Li/Li_{1.3}Ni_{0.2}Mn_{0.6}O_2$ electrochemical cells constructed with a positive electrode, a negative electrode, and a non-aqueous electrolyte. The positive electrode consisted of 80 wt % lithium metal oxide powder, 10 wt % carbon, and 10 wt % PVDF binder on aluminum foil. The negative electrode was metallic lithium. The non-aqueous electrolyte was 1.2 mol/L LiPF$_6$ in a 3:7 wt % mixture of ethylene carbonate (EC) and ethyl methyl carbonate (EMC) solvents. FIG. 14 shows the rate capability characteristics of this $Li/Li_{1.3}Ni_{0.2}Mn_{0.6}O_2$ cell. The cell was cycled between 2 and 4.6V at increasing charge/discharge rates after activation at 4.9V during the first cycle. Cycles 2 through 4 were performed at a constant current density of 24.7 mA/g, cycles 5 through 7 were performed at a constant current density of 49.4 mA/g, cycles 8 through 10 were performed at a constant current density of 98.8 mA/g, and cycles 11 through 13 were performed at a constant current density of 247 mA/g. The first specific discharge capacity was 223 mAh/g at a constant current density of 24.7 mA/g. A 66% capacity can be retained when the charge/discharge current density increased from 24.7 mA/g ($2^{nd}$ cycle) to 247 mA/g ($13^{th}$ cycle). The initial capacity loss during the first cycle was 70 mAh/g which can be translated to 76% initial coulombic efficiency.

While some embodiments have been illustrated and described, it should be understood that changes and modifications can be made therein in accordance with ordinary skill in the art without departing from the invention in its broader aspects as defined in the following claims.

We claim:

1. A material comprising:
  a plurality of metal oxide secondary particles comprising primary particles, wherein;
    an average primary particle size is about 1 nm to 500 nm;
    an average secondary particle size is about 1 μm to 100 μm;
    the material is a positive active material; and
    the primary particles comprise $Li_{1.1}Ni_{0.2}Mn_{0.6}O_2$.

2. The material of claim 1, wherein the secondary particles are spherical.

3. The material of claim 1, wherein the material further comprises a carbon-coating.

4. An electrochemical device comprising:
  a positive electrode comprising the material of claim 1;
  a negative electrode;
  and a non-aqueous electrolyte.

* * * * *